United States Patent
Kim et al.

(10) Patent No.: US 10,069,554 B2
(45) Date of Patent: Sep. 4, 2018

(54) METHOD FOR TRANSMITTING REFERENCE SIGNAL IN MULTI-ANTENNA WIRELESS COMMUNICATION SYSTEM AND DEVICE FOR SAME

(71) Applicant: LG ELECTRONICS INC., Seoul (KR)

(72) Inventors: Youngtae Kim, Seoul (KR); Bonghoe Kim, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/526,695

(22) PCT Filed: Nov. 13, 2015

(86) PCT No.: PCT/KR2015/012204
§ 371 (c)(1),
(2) Date: May 12, 2017

(87) PCT Pub. No.: WO2016/076657
PCT Pub. Date: May 19, 2016

(65) Prior Publication Data
US 2017/0310374 A1    Oct. 26, 2017

Related U.S. Application Data

(60) Provisional application No. 62/079,548, filed on Nov. 13, 2014.

(51) Int. Cl.
*H04B 7/06*      (2006.01)
*H04L 27/26*     (2006.01)
(Continued)

(52) U.S. Cl.
CPC .......... *H04B 7/063* (2013.01); *H04B 7/0452* (2013.01); *H04B 7/0671* (2013.01);
(Continued)

(58) Field of Classification Search
CPC .... H04B 7/063; H04B 7/0452; H04B 7/0671; H04L 1/1861; H04L 1/1893; H04L 5/0048; H04L 27/2636
See application file for complete search history.

(56) References Cited

U.S. PATENT DOCUMENTS

2012/0213113 A1* 8/2012 Zhao .................... H04B 7/0626
                                                             370/252
2013/0258964 A1* 10/2013 Nam ................... H04W 72/046
                                                             370/329
(Continued)

FOREIGN PATENT DOCUMENTS

WO    2011145886    11/2011

OTHER PUBLICATIONS

PCT International Application No. PCT/KR2015/012204, Written Opinion of the International Searching Authority dated Feb. 24, 2016, 22 pages.
(Continued)

*Primary Examiner* — Asad Nawaz
*Assistant Examiner* — Saad A Waqas
(74) *Attorney, Agent, or Firm* — Lee, Hong, Degerman, Kang & Waimey

(57) ABSTRACT

The present invention relates to a method by which a base station transmits a reference signal in a wireless communication system supporting a full-dimension antenna, and a device for the same. Particularly, the method comprises the steps of: transmitting, to a terminal, a channel state information-reference signal (CSI-RS) configuration indicating the number of antenna ports for transmitting a full-dimen-
(Continued)

sion antenna association reference signal; transmitting, to the terminal, a CSI-RS for at least one first antenna port among whole antenna ports for the full-dimension antenna; and receiving, from the terminal, channel information on all of the antenna ports on the basis of the at least one first antenna port.

9 Claims, 7 Drawing Sheets

(51) Int. Cl.
  *H04B 7/0452* (2017.01)
  *H04L 5/00* (2006.01)
  *H04L 1/18* (2006.01)
(52) U.S. Cl.
  CPC .......... *H04L 1/1861* (2013.01); *H04L 1/1893* (2013.01); *H04L 5/0048* (2013.01); *H04L 27/2636* (2013.01)

(56) References Cited

U.S. PATENT DOCUMENTS

| | | | |
|---|---|---|---|
| 2014/0112184 A1 | 4/2014 | Chai | |
| 2015/0043439 A1* | 2/2015 | Sajadieh | ............... H04W 76/14 |
| | | | 370/329 |
| 2016/0112167 A1* | 4/2016 | Xu | ........................... H04L 5/005 |
| | | | 370/329 |
| 2017/0019159 A1* | 1/2017 | Vook | .................... H04B 7/0478 |
| 2018/0062728 A1* | 3/2018 | Kim | ......................... H04B 7/10 |

OTHER PUBLICATIONS

LG Electronics, "RS design enhancements for supporting EB and FD-MIMO", 3GPP TSG RAN WG1 Meeting #78bis, R1-144047, Oct. 2014, 5 pages.

* cited by examiner (a)

(b)

(a)

(b)

(a)

(b)

(c)

METHOD FOR TRANSMITTING REFERENCE SIGNAL IN MULTI-ANTENNA WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2015/012204, filed on Nov. 13, 2015, which claims the benefit of U.S. Provisional Application No. 62/079,548, filed on Nov. 13, 2014, the contents of which are all hereby incorporated by reference herein in their entirety.

TECHNICAL FIELD

The present invention relates to a wireless communication system, and more particularly, to a method of transmitting a reference signal for measuring a channel in a multi-antenna wireless communication system and an apparatus therefor.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE (3$^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index. $h_{r,1}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R. $R=E[H_{i,k}^{H} H_{i,k}]$ where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times m} \Sigma_{m \times n} V_{n \times n}^{H}$$

Here, U and V represent unitary matrices and Σ denotes an m×n matrix including a non-zero singular value. The singular value is $\Sigma = \text{diag}(\sigma_1 \ldots \sigma_r), \sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^{H} = (U\Sigma V^{H})(U\Sigma V^{H})^{H} = U\Sigma\Sigma^{T}U^{H}$$

$$H^{H}H = (U\Sigma V^{H})^{H}(U\Sigma V^{H}) = V\Sigma^{T}\Sigma V$$

Here, Eigen values can be $\lambda_1, \ldots, \lambda_r$. Information on U between U and V, which indicate channel directions, can be known through singular value decomposition of $HH^{H}$ and information on V can be known through singular value decomposition of $H^{H}H$. In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU(Σ) VW Accordingly, it is desirable to generate the receiving end beam on the basis of U and to generate the transmitting end beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W'=\text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V \Lambda V^H = \sum_{i=1}^{Nt} \sigma_i v_i v_i^H \quad \text{[Equation 2]}$$

Here, the long-term covariance matrix R of the channel matrix H is decomposed into $V\Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{Nt}$).

DISCLOSURE OF THE INVENTION

Technical Task

Based on the aforementioned discussion, a technical task of the present invention is to provide a method of transmitting a reference signal in a multi-antenna wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of transmitting a reference signal, which is transmitted by a base station in a wireless communication system supporting a full-dimension antenna, includes the steps of transmitting a CSI-RS (Channel State Information-Reference Signal) configuration indicating the number of antenna ports for transmitting a reference signal associated with the full-dimension antenna to a user equipment, transmitting a CSI-RS for at least one first antenna port among the total antenna ports for the full-dimension antenna to the user equipment, and receiving a feedback of channel information on the total antenna ports from the user equipment based on the at least one first antenna port.

Preferably, the CSI-RS configuration can be configured to indicate the number of antenna ports only when the full-dimension antenna is supported.

Preferably, the CSI-RS configuration can be configured to indicate all numbers of the at least one first antenna port.

Preferably, the CSI-RS configuration can further include subset information for the at least one first antenna port, and if the number of antenna ports is less than the number of the total antenna ports, the subset information can be used to indicate a port number of the at least one first antenna port.

Preferably, the CSI-RS configuration includes horizontal antenna domain information and vertical antenna domain information for the full-dimension antenna and the at least one first antenna port can be indicated by a combination of the horizontal antenna domain information and the vertical antenna domain information.

Preferably, the horizontal antenna domain information and the vertical antenna domain information can be indicated using a bitmap.

Preferably, the channel information includes first channel information for the at least one first antenna port and second channel information for second antenna ports except the first antenna port among the total antenna ports and the second channel information can be measured using the first channel information and weight information for the second antenna ports.

Preferably, the weigh information can be selected from a set of a plurality of weights preconfigured between the base station and the user equipment.

To further achieve these and other advantages and in accordance with the purpose of the present invention, according to a different embodiment, a base station transmitting a reference signal in a wireless communication system supporting a full-dimension antenna includes an RF (radio frequency) unit and a processor, the processor configured to transmit a CSI-RS (Channel State Information-Reference Signal) configuration indicating the number of antenna ports for transmitting a reference signal associated with the full-dimension antenna to a user equipment, the processor configured to transmit a CSI-RS for at least one first antenna port among the total antenna ports for the full-dimension antenna to the user equipment, the processor configured to receive a feedback of channel information on the total antenna ports from the user equipment based on the at least one first antenna port.

Advantageous Effects

According to embodiments of the present invention, it is able to provide a method of transmitting a reference signal in a multi-antenna wireless communication system and an apparatus therefor.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term "base station (BS)" is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on downlink and transmit information to the BS on uplink. The information that the UE transmits or receives includes data and various types of control information. There are many physical channels according to the types and usages of information that the UE transmits or receives.

A description will be given of 3GPP LTE (3$^{rd}$ Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
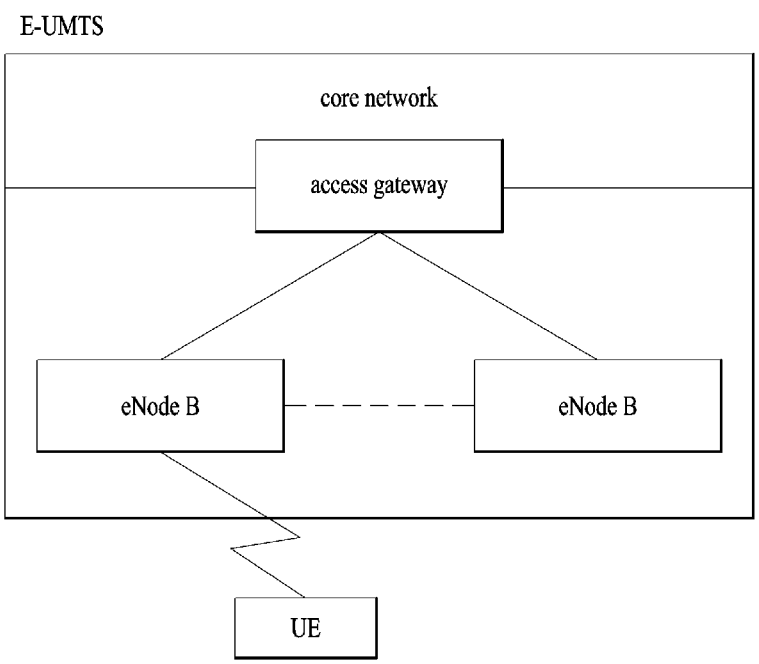
FIG. 1 is a schematic diagram of E-UMTS network structure as one example of a wireless communication system.

FIG. 1 illustrates E-UMTS (Evolved Universal Mobile Telecommunicaiton System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "3$^{rd}$ Generation Partnership Project: Technical Specification Group Radio Access Network".

Referring to FIG. 1, E-UMTS includes a user equipment (UE), an eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
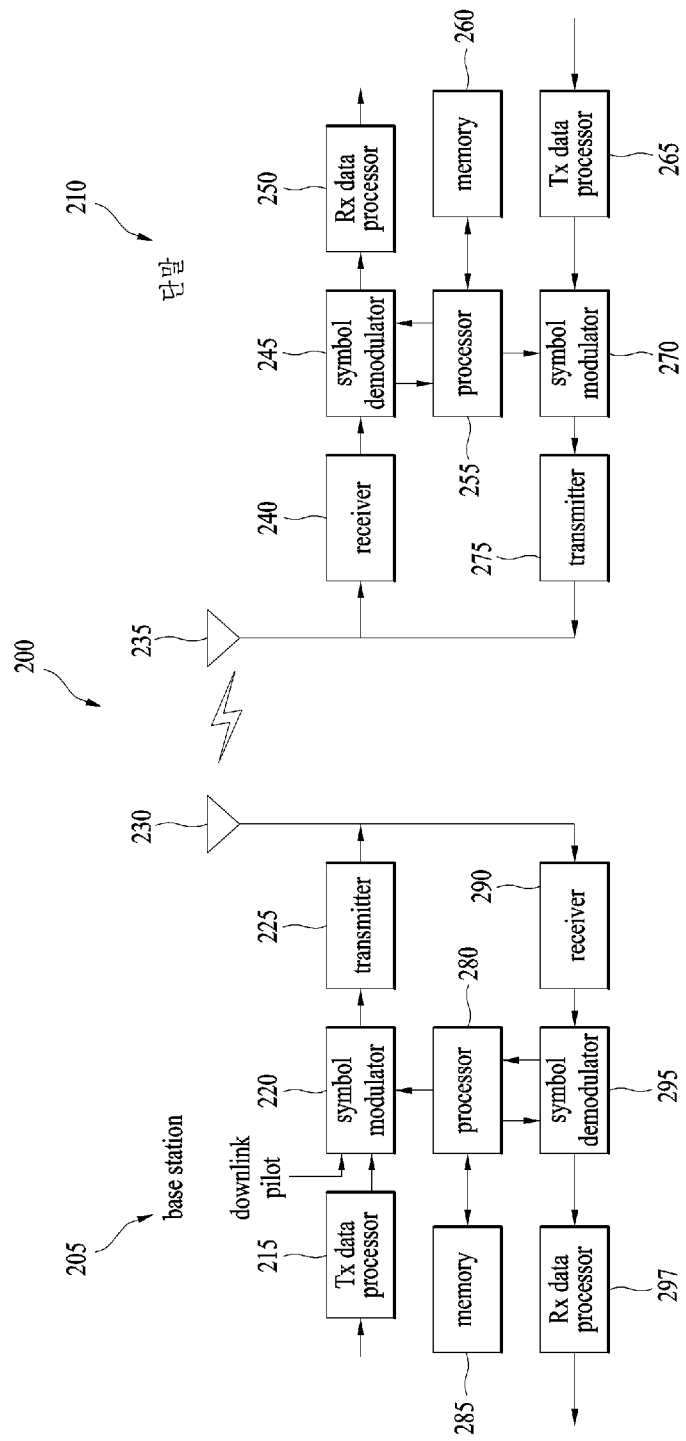
FIG. 2 is a block diagram for configurations of a base station and a UE in a wireless communication system according to the present invention.

FIG. 2 is a block diagram illustrating configurations of an eNB 105 and a UE 110 in a wireless communication system 100.

While one eNB 105 and one UE 110 are shown in FIG. 2 to simplify the configuration of the wireless communication system 100, the wireless communication system 100 may obviously include one or more eNBs and/or one or more UEs.

Referring to FIG. 2, the eNB 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, the eNB 105 and the UE 110 include multiple antennas. Hence, the eNB 105 and the UE 110 support MIMO (Multiple Input Multiple Output). Furthermore, the eNB 105 may support both single user-MIMO (SU-MIMO) and multi-user-MIMO (MU-MIMO) in the present invention.

Moreover, although it is not depicted in FIG. 2, an RF chain corresponds to a part of which a filter and a power amp are combined in an antenna. Specifically, the RF chain can include an RF transmission chain and an RF reception chain. The RF transmission chain includes a DAC (digital-to-analog converter), a mixer for frequency up converting, a PA (power amplifier), a duplexer, and a diplexer. The DAC converts a digital signal into an analog signal in baseband. The mixer multiplies a baseband signal by a carrier to convert the baseband signal into a band-pass signal. The PA raises strength of the band-pass signal. The duplexer plays a role of a filter to distinguish an uplink signal from a downlink signal. The diplexer plays a role of a filter to distinguish (operating) bands different from each other. The RF reception chain includes a diplexer, a duplexer, an LNA (low noise amplifier), a mixer for frequency down converting, and an ADC (analog-to-digital converter). The LNA amplifies strength of a radio signal which is attenuated in the course of transmission. The mixer multiplies a band-pass signal by a carrier to covert the band-pass signal into a baseband signal. The ADC converts an analog signal into a digital signal in a baseband.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the eNB 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In eNB BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the eNB 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180. When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2and L3) based on the three lowest layers of the open system interconnection (OSI) model. A physical layer corresponds to L1and provides an information transmission service on physical channels. A radio resource control (RRC) layer corresponds to L3and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

Multiple Input Multiple Output (MIMO) System

According to the MIMO technology, entire data can be received by combining a plurality of pieces of data received through a plurality of antennas instead of using a single antenna path to receive a whole message. Since the MIMO technology may enhance data transmission rate within a specific range or increase the system range with respect to a specific data transmission rate, the MIMO technology is considered as a next generation mobile communication technology that can be broadly used in mobile communication terminals and relay stations. In addition, this technology is being highly recognized as a promising next generation technology that can overcome the problem of limited transmission amount in the current mobile communication.

FIG. 3(a) is a diagram illustrating a configuration of a general MIMO communication system. As shown in FIG. 3(a), if the number of Tx antennas is increased to $N_T$ and the number of Rx antennas is increased to $N_R$, a theoretical channel transmission capacity is increased in proportion to the number of antennas, unlike the case where a transmitter or receiver uses several antennas. Accordingly, it is possible to remarkably improve a transmission rate and frequency efficiency. As the channel transmission capacity is increased, the transfer rate may also be theoretically increased by a product of a maximum transfer rate $R_O$ upon utilization of a single antenna and a rate increase ratio $R_i$ shown in Equation 3 below.

$$R_i = \min(N_T, N_R) \quad \text{[Equation 3]}$$

For instance, assuming that a MIMO communication system uses 4 Tx antennas and 4 Rx antennas, the MIMO system can theoretically acquire a high transfer rate which is four times higher than that of a single antenna system. After this theoretical capacity increase of the MIMO system has been proved in the middle of 90's, many ongoing efforts are made to various techniques to substantially improve a data transmission rate. Some of the above technologies have been reflected in a variety of wireless communication standards, for example, third-generation mobile communication or next-generation wireless LAN, etc.

The trends for the MIMO relevant studies are as follows. First, many ongoing efforts are made in various aspects to develop and research information theory study relevant to MIMO communication capacity calculations in various channel configurations and multiple access environments, radio channel measurement and model derivation study for MIMO systems, spatiotemporal signal processing technique study for transmission reliability enhancement and transmission rate improvement, etc.

Figure 3:
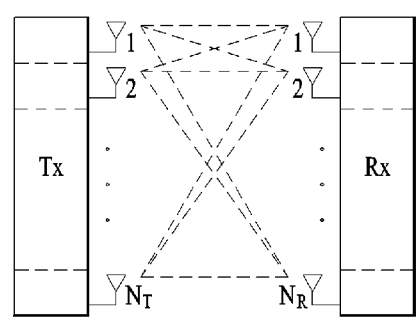
FIG. 3 is a diagram for a configuration of a general MIMO communication system.
Figure 3:
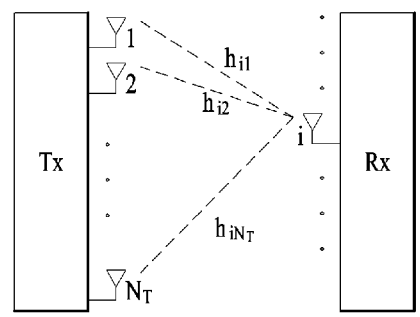

Communication in the MIMO system will be described in detail through mathematical modeling. It is assumed that there are $N_T$ Tx antennas and $N_R$ Rx antennas as illustrated in FIG. 3 (a). Since up to $N_T$ pieces of information can be transmitted through the $N_T$ Tx antennas, a transmission signal can be expressed as a vector in Equation 4.

$$s = [s_1, s_2, \ldots, s_{N_T}]^T \quad \text{[Equation 4]}$$

Meanwhile, a different transmit power may be applied to each piece of transmission information, $s_1, s_2, \ldots, s_{N_T}$. If transmit powers are set to $P_1, P_2, \ldots, P_{N_T}$, respectively, the transmission information with adjusted transmit powers can be represented as a vector in Equation 5.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 5]}$$

In addition, $\hat{s}$ can be represented as Equation 6 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 6]}$$

Assuming a case of configuring $N_T$ transmitted signals $x_1, x_2, \ldots, x_{N_T}$, which will be actually transmitted, by applying a weight matrix W to the information vector $\hat{s}$ having the adjusted transmit powers, the weight matrix W serves to appropriately distribute the transmission information to each antenna according to a transport channel state. The transmitted signals, $x_1, x_2, \ldots, x_{N_T} x_1, x_2, \ldots, x_{N_T}$ can be expressed as shown in Equation 7 using a vector X. In Equation 7, $W_{ij}$ denotes a weight between an $i^{th}$ antenna and $j^{th}$ information and W is also called a weight matrix or a precoding matrix.

$$x = \quad \text{[Equation 7]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

If there are $N_R$ Rx antennas, signals $y_1, y_2, \ldots, y_{N_R}$ received at the antennas can be expressed as a vector in Equation 8.

$$y = [y_1, y_2, \ldots, y_{N_R}]^T \quad \text{[Equation 8]}$$

When channel modeling is performed in the MIMO communication system, channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

The channels can be expressed in the form of a vector or a matrix by combining the channels together. Hereinafter, the vector form is described. FIG. 3(b) shows the channels from the $N_T$ Tx antennas to the Rx antenna i The channels from the $N_T$ Tx antennas to the Rx antenna i shown in FIG. 3(b) can be expressed as follows.

$$h_i^T = [h_{i1}, h_{i2}, \ldots, h_{iN_T}] \quad \text{[Equation 9]}$$

Accordingly, all channels from the $N_T$ Tx antennas to the $N_R$ Rx antennas can be expressed as shown in Equation 10 using the matrix form in Equation 9.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 10]}$$

Since an AWGN (Additive White Gaussian Noise) is added to the actual channels after a channel matrix H, the AWGN $n_1, n_2, \ldots, n_{N_R}$ respectively added to the $N_R$ Rx antennas can be expressed as a vector shown in Equation 11.

$$n=[n_1, n_2, \ldots, n_{N_R}]^T \quad \text{[Equation 11]}$$

In addition, received signals obtained by using the above Equations can be expressed as shown in Equation 12.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 12]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix. In general, the rank of the matrix is defined by the smaller of the number of rows and the number of columns, which are independent from each other. Accordingly, the rank of the matrix is not greater than the number of rows or columns. The rank of the channel matrix H can be expressed as shown in Equation 13 below.

$$\text{rank}(H) \leq \min(N_T, N_R) \quad \text{[Equation 13]}$$

MIMO transmission and reception schemes used for operating the MIMO system may include FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between Tx antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as Equation 14 and Equation 15, respectively. Equation 14 indicates a block code in case of 2 Tx antennas and Equation 15 indicates a block code in case of 4 Tx antennas.

$$\frac{1}{\sqrt{2}} \begin{pmatrix} S_1 & S_2 \\ -S_2^* & S_1^* \end{pmatrix} \quad \text{[Equation 14]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 15]}$$

In Equation 14 and Equation 15, Si (i=1, 2, 3, 4) corresponds to a modulated data symbol. In addition, in Equation 14 and Equation 15, a row of a matrix corresponds to an antenna port and a column of the matrix corresponds to time (STBC) or frequency (SFBC).

Figure 4:
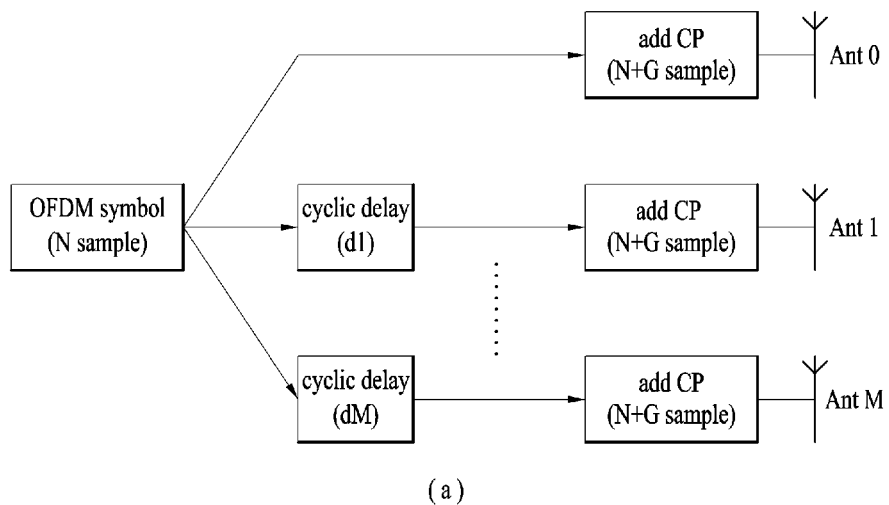
FIG. 4 illustrates an example of a general CDD structure in a multi-antenna system.
Figure 4:
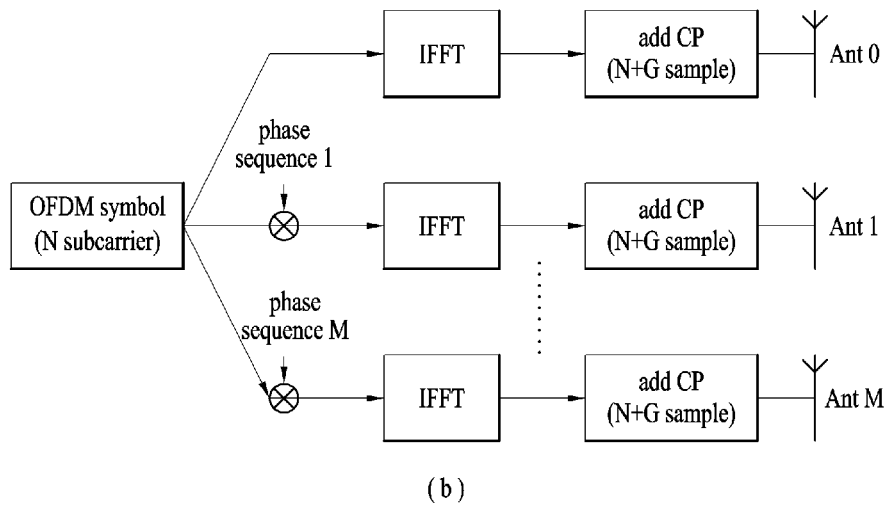

Meanwhile, among the aforementioned MIMO transmission schemes, the CDD scheme corresponds to a scheme of increasing a frequency diversity by increasing delay propagation intentionally. FIG. 4 shows an example of a general CDD structure in a multi-antenna system. Specifically, FIG. 4 (a) shows a scheme of applying cyclic delay in a time domain. The CDD scheme of applying the cyclic delay in FIG. 4 (a) can also be implemented by applying phase-shift diversity as shown in FIG. 4 (b).

Codebook-Based Precoding Scheme

In order to support MIMO transmission, it is possible to apply a precoding configured to appropriately distribute transmission information to each of multiple antennas according to a channel state. According to the codebook-based precoding scheme, a transmitting end and a receiving end determine a set of precoding matrixes in advance, the receiving end (e.g., UE) measures channel information from the transmitting end (e.g., eNB) and provides feedback on a most suitable precoding matrix (i.e., precoding matrix index (PMI)) to the transmitting end, and the transmitting end applies an appropriate precoding to signal transmission based on the PMI.

Since the codebook-based precoding scheme is a scheme of selecting an appropriate precoding matrix from the predetermined set of precoding matrixes, an optimized precoding is not always applied but feedback overhead can be reduced compared to a case of explicitly providing feedback on precoding information optimized for actual channel information.

Figure 5:
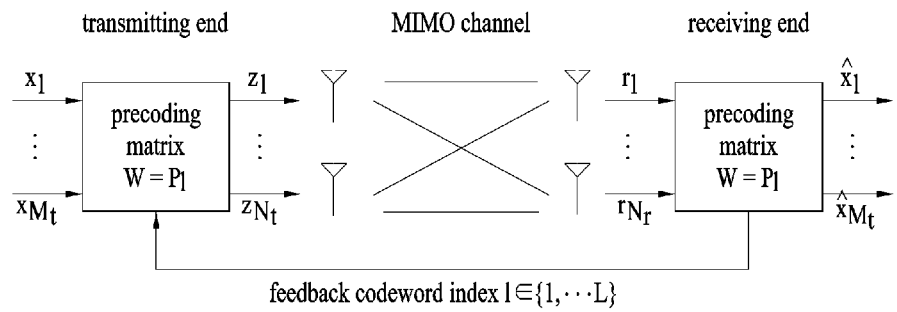
FIG. 5 is a diagram for explaining a basic concept of codebook-based precoding.

FIG. 5 is a diagram for explaining a basic concept of a codebook-based precoding.

When a codebook-based precoding scheme is applied, a transmitting end and a receiving end share codebook information including the prescribed number of precoding matrixes, which are predetermined according to a transmission rank, the number of antennas, and the like. That is, when feedback information is finite, the codebook-based precoding scheme can be used. The receiving end measures a channel state through a received signal and may provide feedback on information on the finite number of preferred precoding matrixes (i.e., an index of a corresponding precoding matrix) to the transmitting end based on the aforementioned codebook information. For instance, the receiving end measures a received signal using an ML (maximum likelihood) scheme or an MMSE (minimum mean square error) scheme and may select an optimized precoding matrix. Although FIG. 5 shows a case that the receiving end transmits precoding matrix information to the transmitting end according to a codeword, the present invention is not limited thereto.

Having received the feedback information from the receiving end, the transmitting end can select a specific precoding matrix from a codebook based on the received information. The transmitting end, which has selected the precoding matrix, performs precoding by multiplying the number of layer signals corresponding to a transmission rank by the selected precoding matrix and may transmit a transmission signal on which the precoding is performed through a plurality of antennas. In a precoding matrix, the number of rows is identical to the number of antennas and the number of columns is identical to a rank value. Since the rank value is identical to the number of layers, the number of columns is identical to the number of layers. For instance, if the number of Tx antennas corresponds to 4 and the number of transmission layers corresponds to 2, a precoding matrix can be configured by a 4×2 matrix. Information transmitted through each layer can be mapped to each antenna through the precoding matrix.

Having received the signal, which is transmitted from the transmitting end by being pre-coded, the receiving end can restore the received signal by performing reverse processing on the precoding. In general, since a precoding matrix satisfies a unitary matrix (U) condition such as $U*U^H=I$, the reverse processing performed on the precoding can be performed using a scheme of multiplying Hermit matrix $(P^H)$ of a precoding matrix (P) used by the transmitting end for the precoding by the received signal.

For instance, Table 1 below shows a codebook used for downlink transmission through 2 Tx antennas in the 3GPP LTE release-8/9 and Table 2 below shows a codebook used for downlink transmission through 4 Tx antennas in the 3GPP LTE release-8/9.

TABLE 1

| Codebook | Number of layers $\upsilon$ | |
|---|---|---|
| Index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained from a set $\{s\}$ configured by the equation of $W_n = I - 2u_n u_n^H / u_n^H u_n$. In this case, I indicates a 4×4 single matrix and $u_n$ is a value given in Table 2.

As shown in Table 1, in case of a codebook for 2 Tx antennas, it may have a total of 7 precoding vectors/matrixes. In this case, since a single matrix is used for an open-loop system, a total of 6 precoding vectors/matrixes are used for a close-loop system. In addition, in case of a codebook for 4 Tx antennas shown in Table 2, it may have a total of 64 precoding vectors/matrixes.

The aforementioned codebook has a common property such as a CM (constant modulus) property, a nested property, a constrained alphabet property, and the like. The CM property means that each element of all precoding matrixes in a codebook does not include '0' and has the same size. The nested property means that a precoding matrix of a lower rank is configured by a subset of a specific column of a precoding matrix of a higher rank. The constrained alphabet property means that an alphabet of each element of all precoding matrixes in a codebook is configured by $$\left\{ \pm 1, \pm j, \pm \frac{(1+j)}{\sqrt{2}}, \pm \frac{(-1+j)}{\sqrt{2}} \right\}.$$

Feedback Channel Structure

Basically, since an eNB is unable to know information on a downlink channel in an FDD (frequency division duplex) system, the eNB uses channel information fed back by a UE for downlink transmission. In the legacy 3GPP LTE release-8/9 system, a UE can feedback downlink channel information through a PUCCH or PUSCH. In the case of the PUCCH, the PUCCH periodically feedbacks channel information. In the case of the PUSCH, the PUSCH aperiodically feedbacks channel information according to a request of the eNB. In addition, channel information can be fed back in response to the whole of assigned frequency bands (i.e., wideband (WB)) or a specific number of RBs (i.e., subband (SB)).

Extended Antenna Configuration

Figure 6:
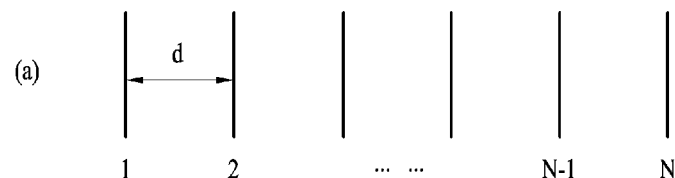
FIG. 6 illustrates examples of configuring 8 transmission antennas.
Figure 6:
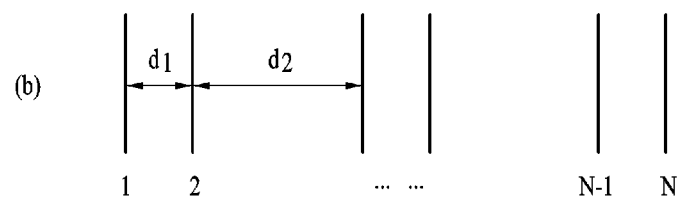
Figure 6:
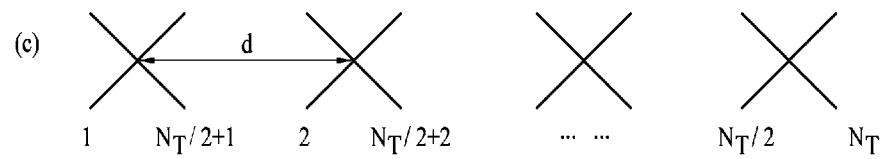

FIG. 6 is a diagram for examples of configuring 8 Tx antennas.

FIG. 6 (a) shows a case that N antennas configure an independent channel without grouping. In general, this case is referred to as an ULA (uniform linear array). If a plurality of antennas are deployed apart from each other, a space of a transmitter and/or a receiver may not be enough to configure channels independent from each other.

FIG. 6 (b) shows an antenna configuration (paired ULA) according a ULA scheme where two antennas make a pair. In this case, an associated channel may exist between the two antennas making a pair and an independent channel may exist between antennas belonging to a different pair.

Meanwhile, unlike the legacy 3GPP LTE release-8/9 using 4 Tx antennas in downlink, the 3GPP LTE release-10 system may use 8 Tx antennas in downlink. To apply the extended antennas configuration, it is necessary to install many antennas in an insufficient space. Thus, the ULA antenna configurations shown in FIGS. 6 (a) and (b) may not be appropriate for the extended configuration. Therefore, as shown in FIG. 6 (c), it may consider applying a dual-pole (or cross-pole) antenna configuration. If Tx antennas are configured using the dual-pole (or cross-pole) antenna configuration, even though a distance d between antennas is relatively short, it is able to transmit data of high throughput by lowering antenna correlation.

Codebook Structures

As described above, if a predefined codebook is shared between transmitting and receiving ends, it is possible to reduce overhead of the receiving end resulted from making a feedback on precoding information to be used for MIMO transmission of the transmitting end. Hence, the precoding can be efficiently applied.

As an example of configuring a predetermined codebook, a precoder matrix may be configured using a DFT (Discrete Fourier Transform) matrix or a Walsh matrix. Alternatively, various forms of precoders may be implemented by combining the precoder matrix with a phase shift matrix or a phase shift diversity matrix.

If co-polarization antennas are used, a DFT-based codebook can guarantee good performance. In addition, when a DFT matrix-based codebook is configured, an n×n DFT matrix can be defined as Equation 16 below.

$$DFTn: D_n(k, l) = \frac{1}{\sqrt{n}} \exp(-j2\pi kl/n), \quad [\text{Equation 16}]$$

$$k, l = 0, 1, \ldots, n-1$$

The DFT matrix shown in Equation 16 exists as a single matrix with respect to a specific size n. Thus, to define various precoding matrixes and appropriately use the various precoding matrixes depending on a situation, it may consider additionally configuring and using a rotated version of a DFTn matrix. Equation 17 below shows an example of a rotated DFTn matrix.

$$\text{rotated } DFTn: D_n^{(G,g)}(k, l) = \frac{1}{\sqrt{n}} \exp(-j2\pi k(l+g/G)/n), \quad [\text{Equation 17}]$$

$$k, l = 0, 1, \ldots, n-1, g = 0, 1, \ldots, G.$$

If a DFT matrix is configured as shown in Equation 17, it is possible to generate G rotated DFTn matrixes and the generated matrixes satisfy properties of the DFT matrix.

Hereinafter, a householder-based codebook structure is explained. The householder-based codebook structure means a codebook configured by a householder matrix. The householder matrix is a matrix used for householder transform. The householder transform is a sort of linear transformations and can be used to perform QR decomposition. The QR decomposition is to decompose a matrix into an orthogonal matrix (Q) and an upper triangular matrix (R). The upper triangular matrix means a square matrix where all components below a main diagonal line component are 0. For example, a 4×4 householder matrix can be expressed as shown in Equation 18 below.

$$M_1 = I_4 - 2u_0 u_1^H / \|u_0\|^2 = \qquad [\text{Equation 18}]$$

$$\frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, u_0^T = [\,1 \;\; -1 \;\; -1 \;\; -1\,]$$

It is possible to generate a 4×4 unitary matrix having the CM property by the householder transform. Similar to the codebook for 4 Tx antennas shown in Table 2, an n×n precoding matrix can be generated using the householder transform and it is possible to configure the precoding matrix to be used for rank transmission less than n using a column subset of the generated precoding matrix.

Codebook for 8 Tx Antennas

According to the 3GPP LTE release-10 system where an extended antenna configuration (e.g., 8 Tx antennas) is used, a feedback scheme used in the legacy 3GPP LTE release-8/9 system may be applied by extending the feedback scheme. For example, it is possible to feedback channel state information (CSI) such as an RI (rank indicator), a PMI (precoding matrix index), CQI (channel quality information) and the like. Hereinafter, a description will be given of a method for designing a dual precoder-based feedback codebook capable of being used in a system supporting an extended antenna configuration. To indicate a precoder of the dual precoder-based feedback codebook, which will be used for MIMO transmission at a transmitting end, a receiving end can transmit a precoding matrix index to the transmitting end. A precoding matrix can be indicated by a combination of two different PMIs. That is, if the receiving end feedbacks the two different PMIs (i.e., a first PMI and a second PMI) to the transmitting end, the transmitting end may determine a precoding matrix indicated by the first and the second PMI then apply the determined precoding matrix to the MIMO transmission.

In designing the dual precoder-based feedback codebook, it may consider MIMO transmission performed by 8 Tx antennas, whether single user-MIMO (SU-MIMO) or multiple user-MIMO (MU-MIMO) is supported, suitability of various antenna configurations, a codebook design standard, a codebook size, etc.

In case a codebook is applied to MIMO transmission performed by the 8 Tx antennas, if the codebook is greater than rank 2, SU-MIMO is supported only. If the codebook is equal to or less than the rank 2, a feedback codebook should be designed such that it is optimized for both the SU-MIMO and the MU-MIMO and appropriate for various antenna configurations.

Regarding the MU-MIMO, it is preferred to make UEs participating in the MU-MIMO be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. In addition, in high scattering propagation environment (e.g., indoor environment where there are many reflected waves) capable of generating many spatial channels, a SU-MIMO operation may be more suitable rather than a MIMO transmission scheme. Hence, a codebook for a rank greater than rank-2 needs to be designed to have good performance in identifying multiple layers.

When designing a precoder for MIMO transmission, it is preferred to make a precoder structure have good performance in response to various antenna configurations (low correlation, high correlation, cross-polarization, and the like). When 8 Tx antennas are arranged, it is possible to configure a cross-polarization array having 4 λ antenna space as a low-correlation antenna configuration, a ULA having 0.5 λ antenna space as a high-correlation antenna configuration, or a cross-polarization array having 0.5 λ antenna space as a cross-polarization antenna configuration. In addition, a DFT-based codebook structure can provide good performance in response to the high-correlation antenna configuration.

Meanwhile, block diagonal matrixes may be more suitable for the cross-polarization antenna configuration. Thus, if a diagonal matrix is applied to a codebook for 8 Tx antennas, it is possible to configure a codebook capable of providing goof performance with respect to all antenna configurations.

As described above, the codebook design standard needs to satisfy a unitary codebook, a CM property, a constrained alphabet property, an appropriate codebook size, a nested property and the like. This standard has been reflected in the 3GPP LTE release-8/9 codebook design. In addition, it may be considered that the codebook design standard is reflected in the 3GPP LTE release-10 codebook design supporting an extended antenna configuration as well.

Regarding a codebook size, it is necessary to increase the codebook size to sufficiently support advantages obtained by using the 8 Tx antennas. To obtain a sufficient precoding gain from the 8 Tx antennas in a low correlation environment, a large size of a codebook (e.g., a codebook with a size greater than 4 bits with respect to rank 1 and rank 2) may be required. In addition, a 4-bits size of a codebook may be enough to obtain a precoding gain in a high correlation environment. However, to achieve a multiplexing gain in the MU-MIMO, the codebook size for the rank 1 and the rank 2 can be increased.

Based on the above discussion, a method for designing a reference signal when a cyclic delay diversity (CDD) is applied to a precoding is described in the present invention. Particularly, the present invention can be efficiently applied when a transmitter uses massive antennas based on an active antenna system (hereinafter abbreviated as AAS). As a representative example, the present invention can be utilized for downlink communication between an eNB and a UE in a cellular network.

In a wireless communication system after LTE Rel-12, the introduction of the antenna system utilizing the AAS has been discussed. Since each antenna of the AAS corresponds to an active antenna including an active circuit, the AAS can efficiently adapt to a wireless communication environment by changing an antenna pattern. Thus, in the AAS, interference can be reduced and efficient beamforming can also be performed, whereby overall system performance can be improved. Moreover, if the AAS is established in two dimensions (i.e., 2D-AAS), it is possible to adjust a beam direction at a main lobe of each antenna not only in the horizontal direction but also in the vertical direction in terms of the antenna pattern. Thus, the beam adaptation can be performed more efficiently in three dimensions. In addition, it is possible to actively change a transmitted beam depending on a location of a UE based on the above beam adaptation.

Figure 7:
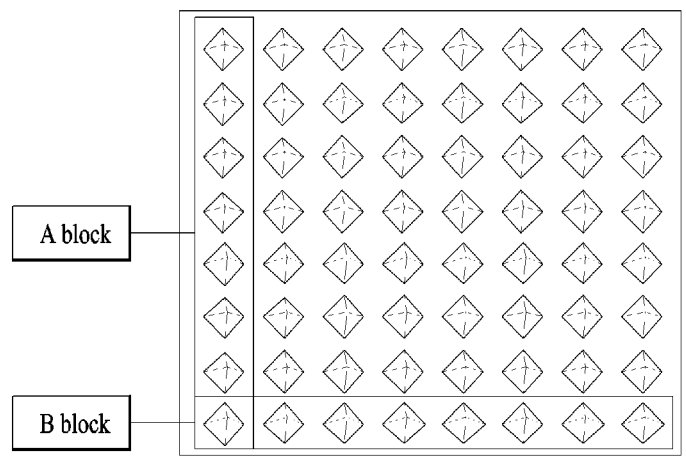
FIG. 7 illustrates an active antenna system *AAS) according to the present invention.

FIG. 7 shows an example of the aforementioned 2D-AAS. As shown in FIG. 7, the 2D-AAS installs antennas in vertical and horizontal directions to install a system of a plurality of antennas.

If the 2D-AAS is introduced, it is necessary for a transmitting end to transmit a CSI-RS to inform a receiving end of a channel between the transmitting end and the receiving end. According to a legacy LTE system, the CSI-RS is designed by 2 ports, 4 ports, and 8 ports CSI-RS. Each of n-ports CSI-RS is defined to use n number of resource elements (REs) for a single resource block (RB). If the 2D-AAS has 64 antennas in total in a manner of installing 8 antennas in vertical direction and 8 antennas in horizontal direction, according to a legacy scheme, 64 resource elements (REs) of an RB are used for a CSI-RS. Hence, if a legacy CSI-RS configuration is identically applied to a multi-dimensional antenna system, a CSI-RS overhead problem may occur due to the increase of the number of antennas.

In the following, for clarity, assume that channels between the 2D-AAS and a receiving end are represented by Kronecker product as shown in equation 19 in the following.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_H^{(1)} \otimes H_V^{(1)} \\ H_H^{(2)} \otimes H_V^{(2)} \\ \vdots \\ H_H^{(j)} \otimes H_V^{(j)} \\ \vdots \\ H_H^{(N_R)} \otimes H_V^{(N_R)} \end{bmatrix} \quad \text{[Equation 19]}$$

In equation 19, H corresponds to total channels from a transmitting end to a receiving end and $H_T^{(j)}$ corresponds to channels from the transmitting end to $j^{th}$ reception antenna. $H_V^{(j)}$ and $H_H^{(j)}$ correspond to channels transmitted from an antenna element (or antenna port) in vertical direction and an antenna element in horizontal direction to the $j^{th}$ antenna of the receiving end, respectively. Referring to FIG. 7, $H_V^{(j)}$ corresponds to channels from antennas of a vertical block (e.g., A block) to the $j^{th}$ antenna of the receiving end under the assumption that there exist antennas of the vertical block (e.g., A block) only. $H_H^{(j)}$ corresponds to channels from antennas of a horizontal block (e.g., B block) to the $j^{th}$ antenna of the receiving end under the assumption that there exist antennas of the horizontal block (e.g., B block) only. For clarity, one embodiment of the present invention is explained in the aspect of a random reception antenna. The embodiment of the present invention can be identically applied to a different reception antenna as well. In the following, as shown in equation 20, channels from the transmitting end to a random antenna from which (j) index is removed are mainly explained only.

$$H_T = H_H \otimes H_V \quad \text{[Equation 20]}$$

If equation 20 is applied to an actual channel, a result may not be accurate. In particular, if a channel is formed by a single path rather than multi-path, equation 20 might be accurate. However, if hundreds of paths are gathered, it may be difficult to satisfy the character of Kronecker product. In particular, as a dominant path has higher power compared to other path, it may be able to satisfy the character of Kronecker product. For example, the Kronecker product may operate well in LOS (Line Of Sight). Otherwise, it may be difficult to apply the Kronecker product.

In order to supplement the character of the Kronecker product in multi-path case, according to the present invention, it may be able to configure antenna elements for measuring (estimating) a channel as antenna element/port of a middle range in horizontal/vertical domain.

Figure 8:
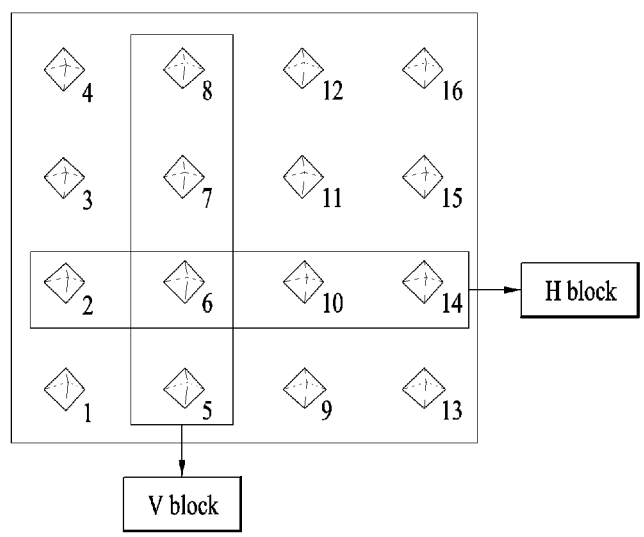
FIGS. 8 and 9 illustrate antenna ports according to one embodiment of the present invention.

FIG. 8 is a diagram for explaining one embodiment of the present invention. Referring to FIG. 8, a UE can perform channel estimation using antenna elements/ports located at the middle range/region among vertical/horizontal antenna elements/ports.

In FIG. 8, a horizontal block (hereinafter, H block) corresponds to horizontal antenna elements to be configured for channels from a horizontal antenna of a base station to a UE. A vertical block (hereinafter, V block) corresponds to vertical antenna elements to be configured for channels from a vertical antenna of a base station to a UE. Referring to FIG. 8, the H block and the V block are deployed to a position close to a center of the total antenna regions rather than an edge of the total antenna regions. By doing so, when channel estimation is performed using the Kronecker product, it may be able to support that channels of antennas to which separate information is not provided can be more easily detected.

Figure 9:
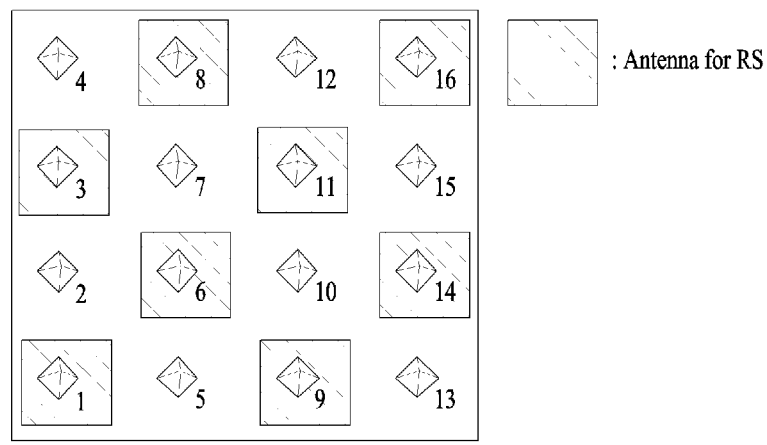

However, in the aspect of restoring the total channels using channels of a part of antennas, as shown in FIG. 9, it may be able to evenly deploy antennas to be used for a reference signal (RS) in the whole of antenna domain rather than using the Kronecker product.

FIG. 9 is a diagram for explaining one embodiment of the present invention. Referring to FIG. 9, since antennas for transmitting a reference signal (RS) are always deployed to a place adjacent to antenna elements/ports having a channel to be restored, it may be more efficiently restore the total channels.

When a reference signal (RS) is transmitted from a partial antenna only among the total antennas, determining a position of the partial antenna in antenna domain is a very important issue. An antenna position at which a reference signal (RS) is to be transmitted varies according to every antenna deployed to a base station. And, the antenna position at which the reference signal is transmitted and an antenna position at which the reference signal is not transmitted but to be restored should be known to a UE to restore the total channels.

Antennas of a base station can be installed in various forms and arrays. In this case, if an antenna position at which a reference signal (RS) is to be transmitted is defined in advance for all types of antennas, it is not efficient. Moreover, if an antenna position at which a reference signal (RS) is to be transmitted is designed for several types of antennas only, there may exist a restriction in using other antennas.

In the embodiments of the present invention, an antenna port may correspond to a logical antenna composed of a single antenna or a plurality of antennas. For example, it may assume that FIG. 9 shows a relative distance of an antenna port corresponding to a logical antenna.

In the present invention, assume that a partial antenna port transmits a reference signal (RS) only among the total antenna ports and channels of the remaining antenna ports are restored using channels of antenna ports at which the reference signal is transmitted. In this case, a base station can inform a UE of information for restoring the antenna ports at which the reference signal (RS) is not transmitted via signaling. In this case, the signaling can be indicated via RRC signaling, an MIB (master information block) or an SIB (system information block). And, it may be able to configure every base station to use the signaling by a fixed value. Or, the signaling can be semi-statically configured.

First of all, a base station informs a UE of an antenna port from which a reference signal (RS) is to be transmitted. For example, the base station can transmit information on an antenna port to which the present invention is applied via a CSI-RS configuration. In this case, if the number of antenna ports is indicated by the CSI-RS configuration, the UE can consider it as transmission of a reference signal is to be performed using AAS.

For example, as shown in FIG. 9, assume that a reference signal (RS) is transmitted from $1^{st}$, $3^{rd}$, $6^{th}$, $8^{th}$, $9^{th}$, $11^{th}$, $14^{th}$, and $16^{th}$ antenna port. The base station can inform the UE of information indicating that the reference signal (RS) is to be transmitted using the $1^{st}$, $3^{rd}$, $6^{th}$, $8^{th}$, $9^{th}$, $11^{th}$, $14^{th}$, and $16^{th}$ antenna ports. In this case, an example (i.e., $1^{st}$, $3^{rd}$, $6^{th}$, $8^{th}$, $9^{th}$, $11^{th}$, $14^{th}$, and $16^{th}$) of the antenna port numbers is just an example only. The antenna port number can be determined based on the total antenna domain, number of antennas, a relative distance between antenna ports from which a reference signal is transmitted, and the like.

In this case, a reference signal transmitting antenna port number may implicitly indicate the number of antenna ports from which the reference signal is to be transmitted. In particular, information on antenna ports transmitting an RS may vary depending on the number of antenna ports from which the RS is to be transmitted. For example, when a base station transmits an RS using 2 antenna ports, the base station may indicate $1^{st}$ and $3^{rd}$ antenna ports only. When the base station transmits an RS using 4 antenna ports, the base station may indicate $1^{st}$, $3^{rd}$, $6^{th}$, and $8^{th}$ antenna ports. In particular, the base station can indicate antenna port number, which is determined according to the number of antennas, based on information of a preconfigured or signaled antenna port.

When an antenna port number is indicated according to the number of antenna ports from which a reference signal (RS) is to be transmitted, the antenna port number can be indicated only when the number of antenna ports from which the reference signal is to be transmitted corresponds to a maximum value. If the number of antenna ports is smaller than the maximum value, the antenna port number can be assumed as a subset of a set of antenna port numbers which are transmitted at the maximum value. In this case, the subset can be defined in advance between the base station and the UE. For example, when the base station informs the UE that maximum 8 antenna ports ($1^{st}$, $3^{rd}$, $6^{th}$, $8^{th}$, $9^{th}$, $11^{th}$, $14^{th}$, and $16^{th}$ antenna ports) are used to transmit a reference signal (RS), if 4 antenna ports are indicated/configured, the base station and the UE can determine that $1^{st}$, $3^{rd}$, $6^{th}$, and $8^{th}$, antenna ports are to be used.

Moreover, when the base station informs the UE of an antenna port number at which a reference signal (RS) is to be transmitted, the base station can inform the UE of a vertical antenna and a horizontal antenna, respectively. For example, if it is assumed that a reference signal (RS) is transmitted from antenna ports 1, 3, 9, and 11, the base station can inform the UE of vertical antennas 1 and 3 and horizontal antennas 1 and 3, respectively. Hence, the UE can determine that specific antenna ports corresponding to vertical antenna information and horizontal antenna information received from the base station to be used. The antenna port number of antenna ports from which a reference signal is to be transmitted can be transmitted according to the number of antenna ports from which the reference signal is to be transmitted.

When the base station informs the UE of a vertical antenna port number and a horizontal antenna port number according to the number of antenna ports from which a reference signal is to be transmitted, the base station can inform the UE of the antenna port numbers only when the number of antenna ports from which a reference signal is to be transmitted corresponds to a maximum value. If the number of antenna ports is smaller than the maximum value, the antenna port numbers can be assumed as a subset of a set of horizontal and vertical antenna ports which are transmitted at the maximum value. In this case, the subset can be defined in advance between the base station and the UE.

When an antenna port number of an antenna port from which a reference signal is to be transmitted is not specifically used, the base station can inform the UE of the number of antenna ports from which a reference signal is to be transmitted only. For example, if the UE receives information indicating that a reference signal is transmitted from 8 antenna ports, it may be able to assume that the reference signal is transmitted using antenna ports a, b, c, d, e, f, g, and h. When the base station informs the UE of the number of antennas to be used for transmitting a reference signal (RS) only, a port number of an antenna from which the reference signal is to be transmitted can be determined in advance between the base station and the UE. If there is no specifically defined value, it may sequentially mean antenna ports a, b, c, d, e, f, g, and h (in this case, a, b, c, d, e, f, g, and h correspond to randomly configured 8 antenna ports).

When the base station informs the UE of the number of antennas to be used for transmitting a reference signal (RS) only, the base station can inform the UE of the number of antenna ports when a CSI-RS configuration is performed. When the base station informs the UE of the number of antennas to be used for transmitting a reference signal (RS) only, a port number of an antenna from which the reference signal is to be transmitted can be determined in advance between the base station and the UE. If there is no specifically defined value, it may sequentially mean antenna ports a, b, c, d, e, f, g, and h.

Or, the number of antenna ports to be used for transmitting a reference signal (RS) can be determined in advance between the base station and the UE according to a combination of the number of vertical antennas and the number of horizontal antennas of the base station. In this case, the base station can inform the UE of an antenna port from which a reference signal is transmitted using a bitmap.

As shown in FIG. 9, the UE assumes an antenna domain of a rectangular shape in advance to determine a position of an antenna port from which a reference signal is transmitted based on a bitmap informed by the base station. Since the UE is able to automatically know a position of an antenna port from which a reference signal is not transmitted, the UE is able to estimate a channel of the antenna port from which a reference signal is not transmitted.

When the base station informs the UE of antenna ports from which a reference signal (RS) is to be transmitted, a method for the UE to restore a channel is explained.

In this case, assume that the antenna ports informed by the base station correspond to a1, a2, a3, a4, a5, a6, a7, . . . and information on the antenna ports are all transmitted. If 8 antenna ports are used to transmit a reference signal (RS), it may consider that $1^{st}$, $3^{rd}$, $6^{th}$, $8^{th}$, $9^{th}$, $11^{th}$, $14^{th}$, and $16^{th}$ antenna ports correspond to a1, a2, a3, a4, a5, a6, a7, a8 antenna ports.

The base station signals the UE of the number of antenna ports from which a reference signal is not transmitted and a method of restoring channels of the antenna ports.

For example, when the base station informs the UE of the number of antenna ports from which an RS is not transmitted, the base station can inform the UE of antenna port number as well.

In particular, assume that channels of antenna ports from which a reference signal is transmitted correspond to $h_{a1}$, $h_{a2}$, $h_{a3}$, $h_{a4}$, $h_{a5}$, $h_{a6}$, $h_{a7}$, . . . . In this case, assume that $h_i$ corresponds to a channel between an $i^{th}$ antenna port of the base station and a reception antenna of the UE. ($i \in \{a1, a2, a3, a4, a5, a6, a7, \ldots \}$)

In this case, channels of antenna ports from which a reference signal is not transmitted can be calculated by a weighted sum of the channels of the antenna ports from which a reference signal is transmitted. Moreover, the base station can signal the UE of a weight of each antenna port from which a reference signal is not transmitted.

For example, assume that port numbers of antennas from which a reference signal is not transmitted correspond to b1, b2, b3, b4, b5, b6, b7, . . . . The base station informs each $j^{th}$ antenna port $j \in \{b1, b2, b3, b4, b5, b6, b7, \ldots \}$ of a weight $\{w_{a1}, w_{a2}, w_{a3}, w_{a4}, w_{a5}, w_{a6}, w_{a7}, \ldots \}$. In this case, $w_i$ corresponds to a weight to be multiplied with $h_i$.

And, the UE is able to calculate the channels of the antenna ports from which a reference signal is not transmitted by a weighted sum $h_j + w_{a1}h_{a1} + w_{a2}h_{a2} + w_{a3}h_{a3} + w_{a4}h_{a4} + w_{a5}h_{a5} + w_{a6}h_{a6} + w_{a7}h_{a7} + \ldots$ using a weight and the channels of the antenna ports from which a reference signal is transmitted.

In this case, the total weights $\{w_{a1}, w_{a2}, w_{a3}, w_{a4}, w_{a5}, w_{a6}, w_{a7}, \ldots \}$ can be selected from a plurality of sets predetermined between the base station and the UE. Or, an individual weight $w_i$ can be selected from a plurality of values predetermined between the base station and the UE.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method transmitting a reference signal in a multi-antenna wireless communication system and an apparatus therefor are described centering on examples applied to 3GPP LTE system, it may be applicable to various wireless communication systems as well as to the 3GPP LTE system.

What is claimed is:

1. A method of transmitting a reference signal, which is transmitted by a base station in a wireless communication system supporting a full-dimension antenna, comprising the steps of:
    transmitting a CSI-RS (Channel State Information-Reference Signal) configuration indicating a number of antenna ports for transmitting a reference signal associated with the full-dimension antenna to a user equipment;
    transmitting a CSI-RS for at least one first antenna port among total antenna ports for the full-dimension antenna to the user equipment; and
    receiving a feedback of channel information on the total antenna ports from the user equipment based on the at least one first antenna port,
    wherein the channel information comprises first channel information for the at least one first antenna port and second channel information for second antenna ports except the first antenna port among the total antenna ports, and wherein the second channel information is measured using the first channel information and weight information for the second antenna ports.

2. The method of claim 1, wherein the CSI-RS configuration is configured to indicate the number of antenna ports only when the full-dimension antenna is supported.

3. The method of claim 1, wherein the CSI-RS configuration is configured to indicate all antenna port numbers associated with the at least one first antenna port.

4. The method of claim 1, wherein the CSI-RS configuration further comprises subset information for the at least one first antenna port and wherein if the number of antenna ports is less than the number of the total antenna ports, the subset information is used to indicate a port number of the at least one first antenna port.

5. The method of claim 1, wherein the CSI-RS configuration comprises horizontal antenna domain information and vertical antenna domain information for the full-dimension antenna and wherein the at least one first antenna port is indicated by a combination of the horizontal antenna domain information and the vertical antenna domain information.

6. The method of claim 5, wherein the horizontal antenna domain information and the vertical antenna domain information are indicated using a bitmap.

7. The method of claim 1, wherein the weight information is selected from a set of a plurality of weights preconfigured between the base station and the user equipment.

8. A base station transmitting a reference signal in a wireless communication system supporting a full-dimension antenna, comprising:
    an RF (radio frequency) unit; and
    a processor, the processor configured to transmit a CSI-RS (Channel State Information-Reference Signal) configuration indicating a number of antenna ports for transmitting a reference signal associated with the full-dimension antenna to a user equipment,
    the processor configured to transmit a CSI-RS for at least one first antenna port among total antenna ports for the full-dimension antenna to the user equipment, the processor configured to receive a feedback of channel information on the total antenna ports from the user equipment based on the at least one first antenna port,
    wherein the channel information comprises first channel information for the at least one first antenna port and second channel information for second antenna ports except the first antenna port among the total antenna ports, and wherein the second channel information is measured using the first channel information and weight information for the second antenna ports.

9. A method of receiving a reference signal, which is received by a user equipment in a wireless communication system supporting a full-dimension antenna, comprising the steps of:
    receiving a CSI-RS (Channel State Information-Reference Signal) configuration indicating a number of antenna ports for transmitting a reference signal associated with the full-dimension antenna from a base station;
receiving a CSI-RS for at least one first antenna port among total antenna ports for the full-dimension antenna from the base station; and
transmitting a feedback of channel information on the total antenna ports to the base station based on the at least one first antenna port,
wherein the channel information comprises first channel information for the at least one first antenna port and second channel information for second antenna ports except the first antenna port among the total antenna ports, and wherein the second channel information is measured using the first channel information and weight information for the second antenna ports.

* * * * *